Nov. 11, 1952          W. A. EVANS          2,617,243

SUGAR BEET HARVESTER

Filed Dec. 5, 1947          3 Sheets—Sheet 1

FIG. I.

*INVENTOR.*
WILLIAM A. EVANS
BY
ATTORNEY

Nov. 11, 1952 W. A. EVANS 2,617,243
SUGAR BEET HARVESTER
Filed Dec. 5, 1947 3 Sheets-Sheet 2

INVENTOR.
WILLIAM A. EVANS
BY
ATTORNEY

Nov. 11, 1952 — W. A. EVANS — 2,617,243
SUGAR BEET HARVESTER
Filed Dec. 5, 1947 — 3 Sheets-Sheet 3

INVENTOR.
WILLIAM A. EVANS
BY Howard L. Fischer
ATTORNEY

UNITED STATES PATENT OFFICE 2,617,243

SUGAR BEET HARVESTER

William A. Evans, Mankato, Minn.

Application December 5, 1947, Serial No. 789,948

3 Claims. (Cl. 56—121.43)

This invention relates to a sugar beet harvester wherein a front adjustable cutter unit is provided with a series of tooth-like wheels mounted on a transfer shaft and which are adapted to ride over the tops of the beets. These wheels act to cut through the leaves of the beets and ride over the crowns thereof.

It is a feature to provide a crown-splitting knife positioned centrally between the sawtooth-like cutter discs and which blade acts to split the brown of the beet just prior to the topping of the beet.

A further feature resides in providing a topping knife positioned closely adjacent the splitting knife and the rotary sawtoothed wheels so that the top of the beet is severed from the body thereof while the beet is positioned in the ground. The crown-splitting vertical blade divides the crown of the beet, forwardly of the topping knife, and also cuts the vines, weeds and other foreign matter in the path of the crowns of the beets.

It is a feature to provide the topping mechanism as well as the crown-splitting blade and the series of tooth-like wheels connected together in a unit so that the same may be raised and lowered in relation to the ground. In operation, the unit is lowered so that the toothed wheels ride on the ground over the crowns of the beets.

A further feature resides in providing the topping unit with adjusting means so that it may be positioned in a forward or backward direction as well as adjusting the gauge cutter discs in relation to the topping knife. The cutter discs gauge the position of the topping knife which extends slightly below the lower edge of the toothed gauge cutter discs.

A feature resides in splitting the crown of the beet by the central splitting knife which is positioned between the tooth-like gauge wheels. The gauge wheels are formed with teeth which tend to urge the beet back toward the topping knife and provides a new feature in supporting the beet in topping position in the ground and preventing the beet from tilting forward when the topping knife strikes the crown of the beet to cut it off. The feature of splitting the crown of the beet makes it easier for the topping knife to cut that portion of the crown off of the beet which supports the leaves, and as the harvester travels forward the split crown portions of the beet together with the leaves are deflected by the leaf deflectors carried by the topping unit.

Beets grow at different heights and sizes in the field. Thus the more beet which projects above the ground, the more leaves grow from its crown, and all leaf growth or scar must be cut from the beet; therefore the cutting knife must be made adjustable in some manner to be able to cut more or less off of the beet to leave the body clean of these undesirable crown portions.

A feature resides in providing the gauging discs formed with the toothed edges which are adapted to ride over the beet crowns. There is a series of these discs on either side of the crown-splitting knife. Sawtooth gauge discs cut through the leaves down to the crown and these discs ride up and down as they travel over the various sizes of beets. As the disc cutters travel up and down they cause the distance between the knife and the discs to vary. Thus as the gauging discs go up the distance between the knife and the gauging discs is increased for a thicker cut off the crown, and as they lower for a smaller beet or one that does not protrude so far above the ground, the distance is lessened and the result is a narrower cut. To regulate the rapidity with which the gap between the knife and gauging discs is made and to regulate the width of this gap, I provide adjustments for the forward end of the connecting bar between the gauging discs and the knife.

A feature resides in yoking the knife standard or unit to parallel bars which cause the knife to raise vertically, assuring a straight cut off the top of the beet. This is important in the operation of my beet harvester.

A further feature resides in providing a pickup conveyor positioned back of the topping unit, and associated with the front end of the conveyor I provide beet lifting plows which are adjustable in relation to the front end of the conveyor so that under certain ground conditions the plows can be moved forwardly of the pickup end of the conveyor, or the plows may be brought back closely adjacent to the pickup end of the endless conveyor. The beets are removed from the pickup conveyor by the simple wedge-like releasing prongs which project between the rows of tines at the rear end of the conveyor and which drop the topped body of the beet onto a transverse conveyor to carry the topped beet to one side of the harvester.

A primary feature of my beet harvester resides in providing topping means whereby the beet is topped while it is in the ground, and immediately after the top of the beet is severed the leaf deflectors provided throw the tops to either side thereof, leaving a clean path so that the pickup belt with the prongs provided therein can pick up the beet free from undergrowth, tops, etc.

These features constitute the primary objects of my invention. However, other features and details will be more clearly hereinafter defined.

In the drawings forming part of this specification:

Figure 1:
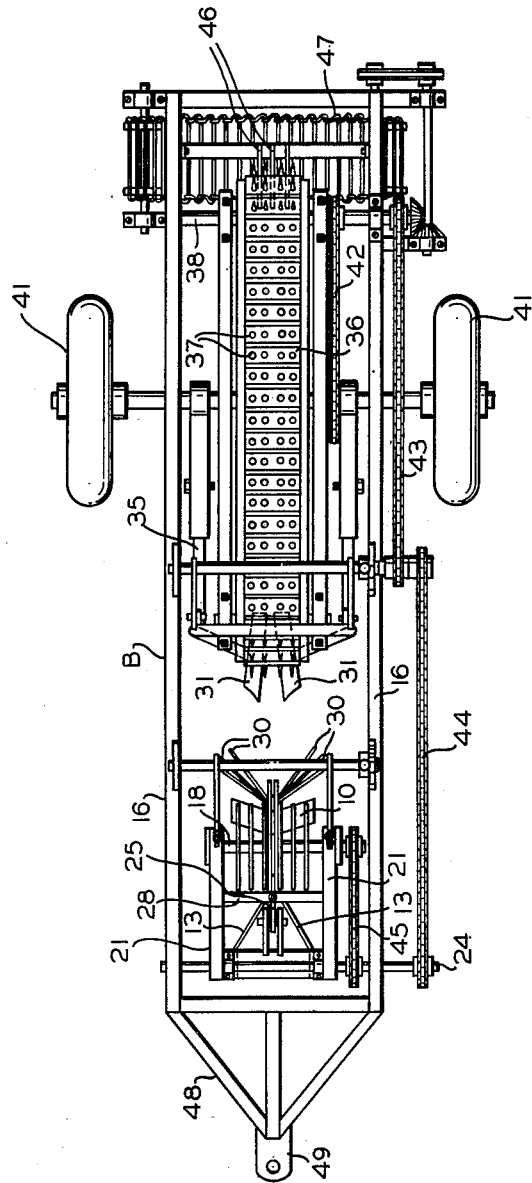
Figure 1 is a plan view of my sugar beet harvester.
Figure 2:
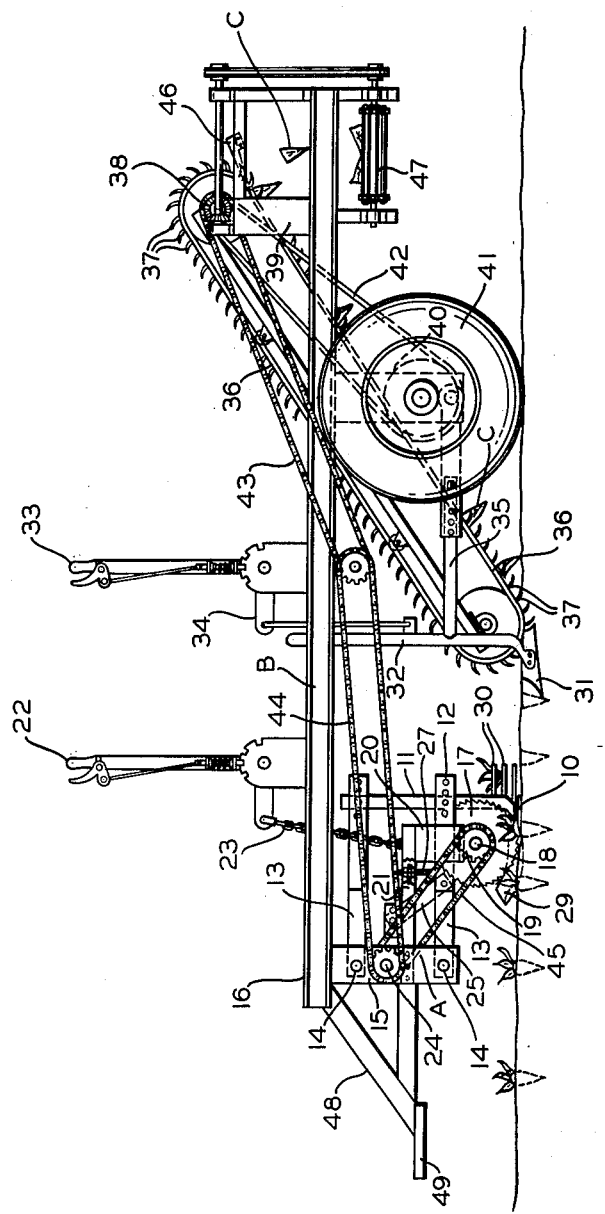
Figure 2 is a side elevation thereof.
Figure 3:
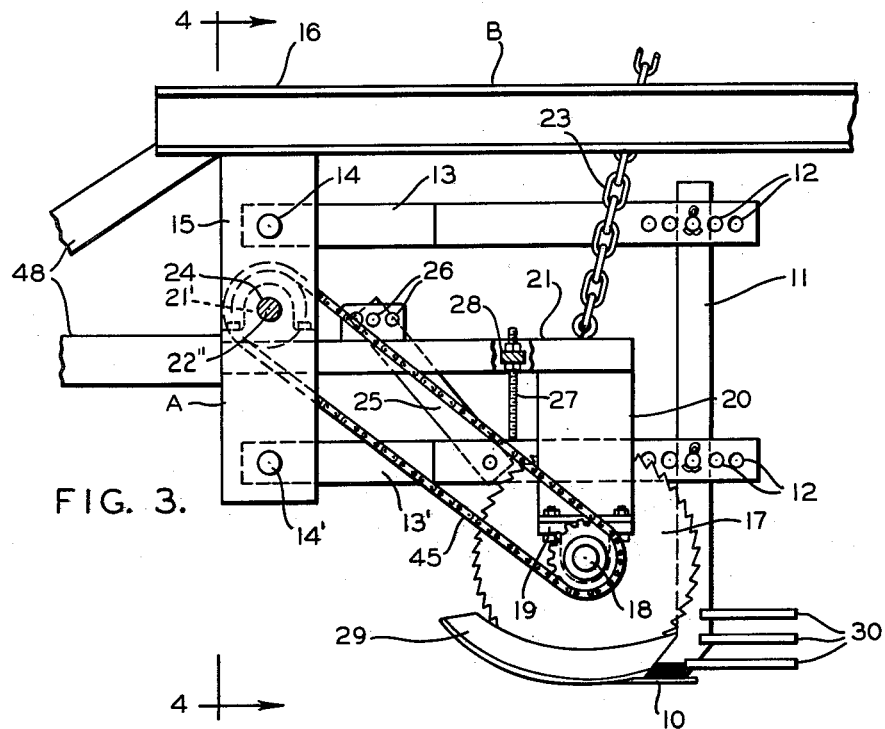
Figure 3 is an enlarged detail of the topping and crown-splitting unit carried by the front end of my beet harvester.
Figure 4:
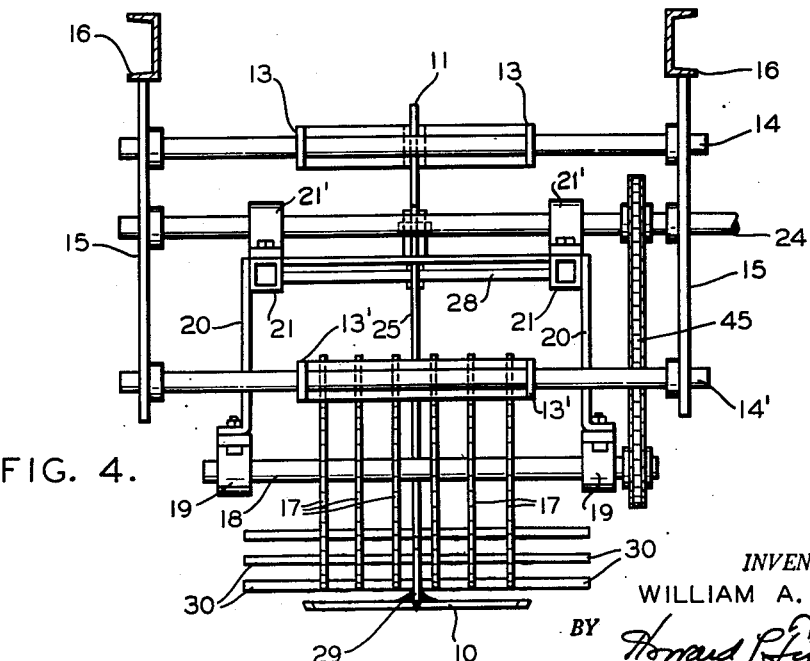
Figure 4 is a front elevation on the line 4—4 of Figure 3 showing the front end of the topping unit.

My beet harvester is provided with a topping knife 10 which is adapted to top the beet while it is held in growing position in the ground. The topping knife 10 is supported by the standard 11 which is pivotally and adjustably supported by means of the holes 12 to the horizontally parallelly disposed bars 13 and 13'. The bars 13 and 13' are pivoted at 14 and 14' respectively to the depending frame 15 which is carried by the main frame 16 of the beet harvester.

The topping unit A is positioned at the front end of the frame 16 which is the forward portion of the harvester B. This unit includes the topping knife 10, a series of toothed gauge wheels 17 rotatably supported on the shaft 18 which in turn is secured in the bearings 19. The bearings 19 are supported to the depending frame 20.

The bars 21 support the depending frame members 20 which support the shaft 18. I provide a hand lever 22 for lifting the knife assembly of the unit A off of the ground which is connected by the chain 23 to the bars 21.

The bars 21 are connected at their forward ends to the bottom of the bearings which support the transverse drive shaft 24. Thus the bars 21 are pivotally supported on the shaft 24. The lower bars 13' and the bars 21 are connected by the adjustable link 25 which is adjusted on its upper end by the series of openings 26. Thus when the hand lever 22 raises the topping unit A off of the ground, the topping knife 10 is lifted through the link 25.

The link 25 supports the cutter knife 10 normally adapted to ride freely over the ground so as to top the crowns of the beets as the harvester B moves forward along the row of beets. The toothed gauge wheels 17 ride freely along the ground level and over the crowns of the beets and raise and lower in accordance with the height of the beet projecting from the ground, which causes the topping knife 10 to cut more or less of the crown off of the beet in proportion to the projecting portion of the beet out of the ground. To limit the movement between the toothed disc wheels and the topping knife 10, I provide an adjustable stop 27 which is carried on the cross bar 28; thus the stop 27 limits the movement between the topping knife 10 and the toothed cutter disc wheels 17.

Centrally positioned between the toothed cutter discs I provide a crown-splitting knife 29 which is supported to the standard 11 and projects forwardly of the topping knife 10. This knife 29 splits the crown of the beet as the machine B travels forward, while the disc cutters 17 cut the vines and weeds as well as the leaves of the beets and tend to force the crowns of the beets against the topping knife 10.

I provide leaf deflector fingers 30 projecting from the rear of the standard 11 adjacent the topping knife 10 which tend to deflect the leaves, the topped split crown portions of the beet heads as well as the vines and weeds, to either side of the harvester as it moves forward. These deflector fingers clear the space in front of the lifting plows 31 which are positioned to the rear of the topping knife 10 so that when the plows reach the beet in the ground, the crown of the beet together with the beet leaves, vines, weeds and other foreign particles are cleared away leaving a free clean topper beet ready to be lifted by the plows 31.

The plows 31 are supported on the upright standards or plow arms 32 which are connected to the hand lever 33 by the links 34. I provide a pair of plow beams 35 which adjustably support the plows 31 so that the plows can be moved toward or away from the cutting knife 10.

The harvester B is provided with a beet lifting carrier belt 36 from which beet engaging prongs 37 project. This belt is of an endless nature and the forward end is positioned adjacent the lifting plows 31 while the rear end is supported on the shaft 38 which is supported by the upright frame portion 39 at the rear end of the frame members 16.

The harvester B is provided with depending frame members 40 which support the rubber tired drive wheels 41. The drive wheels 41 operate the endless belt 36 through the chain 42.

The topping unit A is adapted to be operated from the shaft 38 through the drive chains 43 and 44. The chain 44 drives the shaft 24 which operates the chain 45 to rotate the shaft 18 and drive the tooth-like cutter discs 17.

At the rear end of the lifter belt 36 I provide a series of beet removing wedge-like fingers 46. As the beets are carried up the belt 36 the stationary fingers 46 engage the topped beets C and cause them to be drawn from the prongs 37 and fall onto the transverse endless belt 47 which carries the topped beets to one side of the harvester B. The forward end of the frame members 16 of the beet harvester B is supported by the frame portion 48 to provide the hitching tongue 49 which is adapted to be hitched in any simple manner to a tractor or other source of power to pull the beest harvester B along the rows of beets.

My beet harvester is of a comparatively simple nature, and is adapted to provide a unitary topping means which is located at the forward end of the frame of the harvester and which is adjustable so that the toothed wheels will act as gauge means for adjusting the topping knife to cut more or less off the crown of the beet. This unit may be raised by a hand lever to elevate the same from the ground, and lowered into operating position by the operation of this lever.

The rear portion of my harvester includes the important means of adjusting the plows which raise the beets out of the ground into the proper position in relation to the forward end of the elevating conveyor. I have found that in some types of soil it is desirable to have the lifting plows directly adjacent in front of the lifting conveyor, while in other soils in which the beets are planted it is desirable to move the lifting plows in a manner to space them forwardly of the lifting conveyor.

A primary feature of my harvester resides in topping the beets while they stand upright in the ground in the same position in which they grow, and holding the beet firmly while it is topped by means of sawtoothed disc wheels which simultaneously cut the weeds and vines and beet leaves projecting from the crown. Further, simultaneous with the operation of the toothed wheels which act as gauge means to position the topping knife, I split the crown of the beet in two by a sharp cutting knife projecting ahead of the topping knife. Then in the forward movement of the harvester B, the topped portions of the crowns of the beets are moved together with the weeds, leaves and vines away from the forward end of the lifting conveyor of my harvester so that no leaf particles or portions of the crowns of the beets are in the path of the lifting conveyor. This leaves the lifting plows of my harvester free to lift the topped beets C and permits the conveyor to carry them cleaned of the tops into an elevated position where the topped beets C may be carried to one side of the harvester. I have found it very desirable to top the beets while they stand in growing position in the ground. The ground helps to hold the beets rigid while they are topped and I provide the necessary means to virtually push the beets toward the topping knife as well as cutting away any foreign matter around the beets so that the topped beets may be easily elevated to a conveyor.

I claim:

1. In a beet topping unit for beet harvesters, a vertical standard, a horizontal beet topping knife secured to said standard, an upstanding crown splitting knife secured to said standard forwardly of said topping knife, a pair of depending frame members, a pair of horizontally and parallely disposed bars pivotally secured to said frame members and adjustably and pivotally secured to said vertical standard, a pair of bar members pivotally mounted on said depending frame members, a depending frame secured to the rear ends of said bar members, adjustable stops means secured to said bar members to control the relative movement between said bar members and said parallelly disposed bars, a series of toothed gauge wheels rotatably mounted on the lower ends of said depending frame on both sides of said crown splitting knife, and means for driving said toothed wheels.

2. In a beet topping unit for beet harvesters, a pair of depending frame members, horizontal bars pivotally secured to said frame members, a vertical standard adjustably secured to said horizontal bars, a horizontal beet topping knife secured to the lower end of said vertical standard, a vertical beet crown splitting knife secured to said vertical standard forwardly of said beet topping knife, bar members pivotally secured to said depending frame members, a depending frame secured to said bar members, a series of toothed gauge wheels rotatably mounted on said frame and positioned on each side of said crown splitting knife, means for rotating said wheels, adjustable stop means secured to said bar members and adapted to contact said horizontal bars, an adjustable link connected to said horizontal bars and said bar members for raising said beet topping knife with said gage wheels.

3. In an adjustable beet topping unit for beet harvesters, a pair of depending frame members, pairs of horizontal bar members pivotally secured to said depending frame members, a vertical standard adjustably secured to said horizontal members, horizontal bar means pivotally connected to and within said depending frame members, depending bar frames secured to said horizontal bar means, a shaft connecting the lower ends of said depending bar frames, a series of toothed gauge wheels mounted on said shaft, a horizontal beet topping knife secured to the lower end of said vertical standard, a vertical crown splitting knife secured to said vertical standard forwardly of said beet topping knife and centrally of said gauge wheels, adjustable stop means secured to said horizontal bar means adapted to contact said horizontal bar members to position said gauge wheels in relation to said beet topping knife, an adjustable link connected to said horizontal bar means and said horizontal bar members for raising said beet topping knife with said gauge wheels.

WILLIAM A. EVANS.

REFERENCES CITED

The following references are of record in the file of this patent:

UNITED STATES PATENTS

| Number | Name | Date |
| --- | --- | --- |
| 861,511 | Gettlemann | July 30, 1907 |
| 1,026,714 | Smith | May 21, 1912 |
| 1,339,874 | Wolny | May 11, 1920 |
| 1,582,292 | Mazzocco | Apr. 27, 1926 |
| 1,635,494 | Moreau | July 12, 1927 |
| 2,141,806 | Zielesch | Dec. 27, 1938 |
| 2,261,324 | Zuckerman et al. | Nov. 4, 1941 |
| 2,364,312 | Patterson | Dec. 5, 1944 |